(12) United States Patent
Cornic et al.

(10) Patent No.: US 8,885,782 B2
(45) Date of Patent: Nov. 11, 2014

(54) DEVICE FOR BROADBAND RECEPTION BY AUTOTRANSPOSITION AND APPLICATION TO THE DETECTION AND CHARACTERIZATION OF RADIOELECTRIC EMISSIONS

(75) Inventors: Pascal Cornic, Guilers (FR); Daniel Jahan, Bohars (FR); Patrick Garrec, Merignac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/983,757

(22) PCT Filed: Jan. 6, 2012

(86) PCT No.: PCT/EP2012/050196
§ 371 (c)(1),
(2), (4) Date: Aug. 5, 2013

(87) PCT Pub. No.: WO2012/107250
PCT Pub. Date: Aug. 16, 2012

(65) Prior Publication Data
US 2013/0315287 A1    Nov. 28, 2013

(30) Foreign Application Priority Data

Feb. 10, 2011    (FR) ...................................... 11 00409

(51) Int. Cl.
*H04B 7/10*    (2006.01)
*H04B 7/08*    (2006.01)
(Continued)

(52) U.S. Cl.
CPC ... *H04B 7/08* (2013.01); *G01S 3/40* (2013.01); *G01S 3/46* (2013.01);
(Continued)

(58) Field of Classification Search
CPC ... H01Q 23/00; H01Q 25/00; H01Q 21/0093; H01Q 21/28; H01Q 25/004; H01Q 25/02; H01Q 3/02; H04L 12/2801; H04B 7/04; H04B 7/0413; H04B 7/08; H04B 1/0007; G01S 3/46; G01S 3/40; G01S 3/66
USPC ......... 375/224, 249, 350, 343, 325, 349, 347; 455/273, 232.1, 293, 323, 245.2, 455/245.1, 203; 342/57, 80, 91, 100, 360, 342/378, 427, 431, 437
See application file for complete search history.

(56) References Cited

U.S. PATENT DOCUMENTS 4,922,256 A * 5/1990 Brandstetter .................. 342/132
2009/0274073 A1* 11/2009 Sutton ............................ 370/280

FOREIGN PATENT DOCUMENTS

FR    2742551 A1    6/1997
FR    2971340 A1    8/2012
(Continued)

*Primary Examiner* — Rahel Guarino
(74) *Attorney, Agent, or Firm* — Baker & Hostetler LLP

(57) ABSTRACT

A device is provided for use of an antennal base formed of two antennas which pick up the emissions present and produce two radioelectric signals S1 and S2. These two signals are used to produce at least one intermediate-frequency signal Fl by demodulation of one of the two signals by the other (autotransposition). The demodulation is carried out by firstly transposing one of the signals, S1 for example, around a given frequency F1, the signal S2 being preserved around its initial central frequency $F_0$. Thus, whatever the central frequency $F_0$ of the emission picked up by the antennas, the demodulation produces a signal of central frequency $F_1$, thereafter demodulated into a given intermediate frequency Fl by a local oscillator of constant frequency F2=F1+Fl. The device is applied to the production of a device for detecting emissions and for characterizing the emissions picked up.

26 Claims, 7 Drawing Sheets

(51) Int. Cl.
*G01S 3/40* (2006.01)
*G01S 3/46* (2006.01)
*G01S 3/66* (2006.01)
*H01Q 3/02* (2006.01)
*H01Q 21/20* (2006.01)
*H01Q 25/00* (2006.01)
*H01Q 25/02* (2006.01)
*H01Q 21/28* (2006.01)

(52) U.S. Cl.
CPC .. *G01S 3/66* (2013.01); *H01Q 3/02* (2013.01); *H01Q 21/20* (2013.01); *H01Q 25/00* (2013.01); *H01Q 25/004* (2013.01); *H01Q 25/02* (2013.01); *H01Q 21/28* (2013.01)

USPC ........... 375/347; 375/224; 375/249; 375/350; 375/343; 375/325; 375/349; 455/273; 455/232.1; 455/293; 455/323; 455/245.2; 455/245.1; 455/203

(56) References Cited

FOREIGN PATENT DOCUMENTS

| | | |
|---|---|---|
| GB | 2232843 A | 12/1990 |
| WO | 2012/104201 A1 | 8/2012 |

\* cited by examiner

Principle of a broadband direct detection chain

Principle of a superheterodyne detection chain

DEVICE FOR BROADBAND RECEPTION BY AUTOTRANSPOSITION AND APPLICATION TO THE DETECTION AND CHARACTERIZATION OF RADIOELECTRIC EMISSIONS

CROSS-REFERENCE TO RELATED APPLICATIONS

This application is a National Stage of International patent application PCT/EP2012/050196, filed on Jan. 6, 2012, which claims priority to foreign French patent application No. FR 1100409, filed on Feb. 10, 2011, the disclosures of which are incorporated by reference in their entirety.

FIELD OF THE INVENTION

The invention pertains to the general field of devices for detecting electromagnetic signals, and in particular in respect of those having a very wide expanse of emission frequencies to be received, such as for example radar detectors.

BACKGROUND

The operation of contemporary devices for detecting electromagnetic signals rely, in a known manner, on two different principles:
Very broadband direct detection, the principle of which is illustrated by FIG. 1,
Narrowband superheterodyne reception, the principle of which is illustrated by FIG. 2.
Very broadband direct detection, in a band extending for example between 2 and 18 GHz, exhibits the advantage of hardware simplicity. Its cost of implementation is therefore relatively low. Moreover, it allows, in principle, instantaneous visibility over the whole spectral band of interest. Therefore the probability of intercepting a signal is advantageously a maximum. However, the major drawback of this principle is that it does not exhibit frequency selectivity, this being considered to be penalizing when operating in a dense environment, that is to say filled with radioelectric signals of diverse frequencies.

An essential characteristic of superheterodyne reception is that it is selective on account of the use of a bandpass filter, defined as being appreciably narrower than the totality of the band to be covered (the filter of intermediate frequency: Fl). Accordingly, it entails transposing the signal into intermediate frequency.

Therefore, total coverage of the spectral band of interest, 2 to 18 GHz for example, is conventionally done by scanning the latter, but to the detriment of the probability of intercepting transitory signals such as pulses. To avoid this annoyance, it would be necessary to place in parallel as many reception chains of this type as there is Fl bandwidth in the total band to be covered. This would have the direct consequence of excessively increasing the hardware complexity of the reception function, and therefore its cost. Consequently, it is not generally done.

Therefore, the current tendency, when using a superheterodyne reception system, is to widen the Fl passband and, in order to preserve the desired selectivity, to undertake a spectral analysis in the Fl band, by FFT (Fast Fourier Transform) for example. However, the probability of interception remains lower than in the case of direct broadband reception. Moreover, this principle of narrowband reception, which limits the microwave-frequency noise band, improves sensitivity only to a modest extent. Furthermore, the proliferation of pathways of complete reception (superheterodyne receiver and spectral analyzer), to process in parallel the signals arising quite often from at least four antennas, has the consequence also of leading to hardware complexity and therefore a high cost.

These two types of reception are generally associated with antennal devices exhibiting little gain. The principle observed is generally to cover an angular span of 360° in bearing with a restricted number of antennas, so as notably to minimize the number of parallel reception pathways required to simultaneously process the signals corresponding to the intercepted wavefront. The number of antennas being restricted, use is made of antennas exhibiting low directivity and therefore a lesser gain. This low antenna gain is therefore prejudicial to sensitivity, on which it has a direct influence, in contradistinction to the reduction of microwave-frequency noise band.

For certain applications, it is also known to use systems for superheterodyne reception comprising rotating antennas with large gain. However, the probability of interception of such systems remains very low. Indeed, the effective coverage of the spectral band of interest and of the desired angular aperture, 360° in bearing for example, makes it necessary to undertake a sizable number of scans of the frequency-bearing space.

Hence, in a general manner, the receivers are not truly adapted to signal durations that may vary within a wide span, thus preventing them from being optimal in terms of sensitivity, in particular for waveforms with very low peak power, the waveforms implemented by emissions of LPI (Low Probability of Intercept) type, for example, waveforms with linear frequency modulation (i.e. FMCW or Frequency Modulated Continuous Wave), or else waveforms with phase code modulation.

SUMMARY OF THE INVENTION

An aim of the invention is to propose an alternative reception device, with very wide passband, with very high sensitivity and with high probability of interception. Another aim of the invention is to propose a reception device which is advantageous in terms of cost.

For this purpose the subject of the invention is a broadband reception device, adapted to the reception of radioelectric emissions of central frequency $F_0$ included in a band of frequencies BH. The device according to the invention comprises at least:
two very broadband identical antennas with large gain, which are directional in at least one plane, the two antennas being pointed substantially in the same direction, each of the antennas producing a radioelectric signal S1 or S2 on the basis of the emissions picked up;
a reception chain comprising two phase-coherent local oscillators, of respective frequencies F1 and F2=F1+Fl which are greater than the maximum frequency of the band BH, said reception chain carrying out the demodulation of the radioelectric signals S1 and S2 into an intermediate-frequency signal Fl. According to the invention, the intermediate-frequency signal is obtained in two steps:
by firstly demodulating the signal S1 or the signal S2 by a signal respectively obtained by frequency transposition of the other signal, the signal S2 or S1 respectively, by means of the local oscillator of frequency F1 and by selecting the lower sideband of the spectrum obtained. The demodulated signal obtained is for its part filtered so as to preserve only the upper sideband of the spectrum obtained after demodulation;

by thereafter transposing into intermediate frequency, Fl, the signal obtained by demodulation of the signal S1 or S2 by means of the local oscillator of frequency F2=F1+Fl.

The intermediate-frequency signal thus produced is centered on a constant intermediate frequency Fl whatever the central frequency $F_0$ of the signals received.

The subject of the invention is also a broadband reception device adapted to the reception of radioelectric emissions of central frequency $F_0$ included in a band of frequencies BH. The device according to the invention comprises at least:

two very broadband identical antennas with large gain, which are directional in at least one plane, the two antennas being pointed substantially in the same direction, each of the antennas producing a radioelectric signal S1 or S2 on the basis of the emissions picked up;

a reception chain comprising two local oscillators, of respective frequencies F1 and F2=F1+Fl which are greater than the maximum frequency of the band BH, said reception chain carrying out the demodulation of the radioelectric signals S1 and S2 into two intermediate-frequency signals $I1_{Fl}$ and $Q2_{Fl}$.

According to the invention, the two intermediate-frequency signals are obtained in two steps:

by firstly demodulating each of the two signals S1 or S2 by a signal, $Q_{S2}$ or $I_{S1}$ respectively, obtained by frequency transposition of the other signal, the signal S2 or S1 respectively, by means of a signal of frequency F1 respectively in phase quadrature or in phase with the local oscillator of frequency F1 and by selecting the lower sideband of the spectrum obtained. The demodulated signals I1 and Q2 obtained are for their part filtered so as to preserve only the upper sideband of the spectrum obtained after demodulation;

by thereafter transposing into intermediate frequency, Fl, the signals I1 and Q2 obtained by demodulation of the signals S1 and S2 by means of the local oscillator of frequency F2=F1+Fl.

The intermediate-frequency signals $I1_{Fl}$ and $Q2_{Fl}$ thus produced are centered on a constant intermediate frequency Fl whatever the central frequency $F_0$ of the signals received.

According to one embodiment of the device according to the invention, the antennas are contiguous and arranged according to a phase monopulse configuration, in such a way that their sighting axes are directed in the same direction.

According to another embodiment of the device according to the invention, the antennas are arranged, according to an amplitude monopulse antenna configuration, in such a way that their phase centers are situated at the same place, and that they point in non-parallel directions, differing from one another by an angle α equal to a portion of their angular aperture.

According to another embodiment of the device according to the invention, the antennas are arranged, according to a configuration forming an ambiguous interferometry base, so as to be separated from one another by a space and to sight in the same direction.

According to another embodiment of the device according to the invention, the antennas are arranged so as to be mutually spaced apart and sight in directions offset with respect to one another by an angle corresponding to a portion of the angular aperture.

According to a preferred embodiment of the device according to the invention, the antennal assembly is directional in bearing.

According to another embodiment of the device according to the invention, the antennal assembly is mobile in rotation according to a mechanical scan about a vertical axis, so as to cover an angular sector of less than or equal to 360° in bearing.

According to another preferred embodiment of the device according to the invention, each antenna consists of independent sub-arrays, covering adjacent bands of frequencies, the assembly of sub-arrays covering the totality of the band of frequencies BH to be explored.

According to a variant of the preceding embodiment, the antennas consist of sub-arrays arranged in one and the same vertical plane according to adjacent columns formed of superposed sub-arrays.

According to another variant of the preceding embodiment, the antennas consist of sub-arrays arranged in vertical planes placed back-to-back.

According to another variant of the preceding embodiment, the antennas consist of sub-arrays arranged on the faces of a prism with polygonal base mobile in rotation about an axis.

According to a preferred variant of the preceding embodiment, each sub-array comprises a specific output with which are associated limitation, amplification and filtering means.

According to a preferred variant of the preceding embodiment, the outputs of the sub-arrays which form one and the same antenna are summed after amplification and filtering, to form a single output per antenna.

According to another variant of the preceding embodiment, each sub-array is configured so as to be activated or deactivated independently of the other sub-arrays.

The subject of the invention is also a device for detecting and characterizing radioelectric emissions, which is adapted to the reception and to the characterization of radioelectric emissions of central frequency $F_o$ included in a band of frequencies BH. According to the invention this device comprises at least:

a broadband reception device according to the invention used to produce two intermediate-frequency signals $I1_{Fl}$ and $Q2_{Fl}$;

a processing chain itself comprising:
digitization means carrying out the analog-digital conversion of the signals I1Fl and Q2Fl;
first processing means whose function is to perform, at the output of the reception device, after digitization, a matched filtering of the digitized signals $I1_{Fl}$ and $Q2_{Fl}$;
second processing means whose function is to carry out on the one hand the detection of an emission by comparing the signal level received with a given detection threshold and on the other hand the measurement of the duration and of the period of repetition of the signal received on the basis of its envelope;
third processing means whose function is to carry out, in parallel with the processing carried out by the second means, on the basis of the Fl signals $I1_{Fl}$ and $Q2_{Fl}$ and after sampling and digitization, a measurement of the frequency of the emission detected as well as a measurement of bearing locating the source of the emission, this function being carried out by interferometric measurement between the two reception pathways $I1_{Fl}$ and $Q2_{Fl}$ after matched filtering.

According to one embodiment of this device, the outputs $I1_{Fl}$ and $Q2_{Fl}$ of the reception device are connected after digitization to the input of a filter matched to the duration of the shortest expected pulse.

According to another embodiment of this device, the outputs $I1_{FI}$ and $Q2_{FI}$ of the reception device are connected after digitization to the input of a filter matched to the shortest expected modulation code.

According to another embodiment of this device, the second processing means carry out a quadratic detection of the signal delivered by the matched filters.

According to another embodiment of this device, the second processing means carry out an envelope autocorrelation performed on the signal obtained by quadratic detection.

According to another embodiment of this device, the detection of an emission is performed by comparison with a threshold of the signal received, after quadratic detection.

According to another embodiment of this device, the detection of an emission is performed by comparison with a threshold of the signal received after quadratic detection and envelope autocorrelation.

The device according to the invention makes it possible advantageously to process a very broad band of frequencies with a high sensitivity, using simple and inexpensive means.

It also makes it possible to carry out the detection of signals with continuous emission or with high shape factor, emitted with extremely low power levels.

Moreover, associated with means of linear processing preserving the phase of the signal picked up, the device according to the invention makes it possible advantageously to constitute a more significant device, making it possible to measure the frequency of the signal emitted as well as the angular position of the source with very good accuracy.

BRIEF DESCRIPTION OF THE DRAWINGS

The characteristics and advantages of the invention will be better appreciated by virtue of the description which follows, which description is supported by the appended figures which represent.

DETAILED DESCRIPTION

The text which follows describes the various characteristics of the device according to the invention as well as an application of this device to the production of a system ensuring the detection of emissions and the characterization of the waves constituting the detected emissions, as well as the location of the source of the detected emissions.

The device according to the invention comprises, in a combination, several means which cooperate to solve the problem posed, namely:

At least two identical antennas, with large gain, which are directive in at least one plane, in bearing for example. These antennas are designed to simultaneously receive the signals originating from one and the same remote emitter;

means forming a broadband reception chain for the signals picked up by the antennas, signals whose central frequency included in a given band BH is unknown a priori. These means are configured so as to demodulate the signal S1 picked up by the first antenna by the signal S2 picked up by the second antenna, after frequency transposition, and to demodulate the signal S2 picked up by the second antenna by the signal S1 picked up by the first antenna, after frequency transposition. The demodulated signals are thereafter transposed into intermediate frequency.

Figure 1:
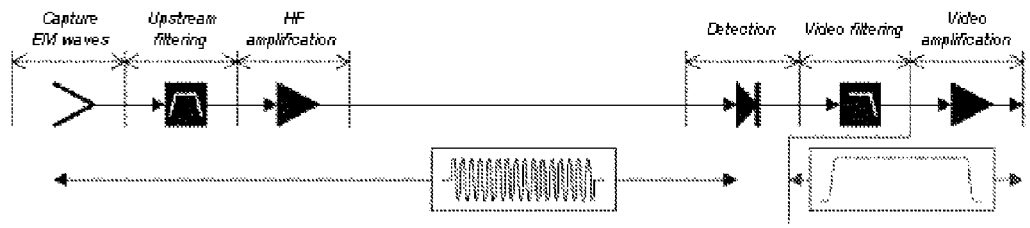
FIGS. 1 and 2, illustrations relating to the prior art.
Figure 2:
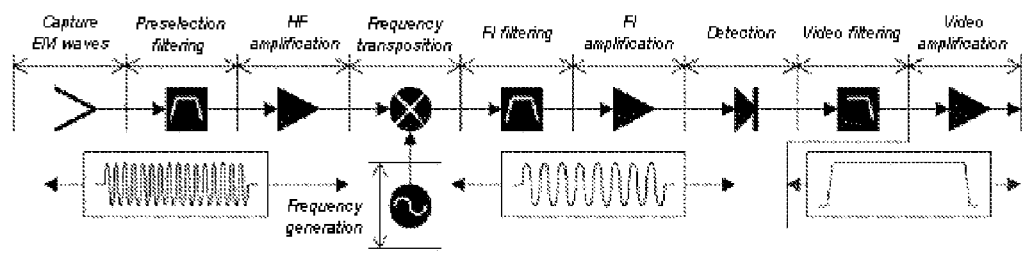
Figure 3:
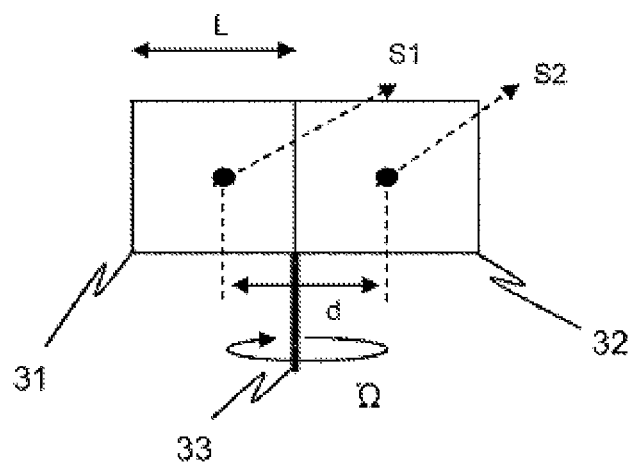
FIG. 3, a basic schematic representation of the structure of the antenna of the device according to the invention.

The reception device according to the invention thus comprises, firstly, an interferometry base constituted, as illustrated by the basic diagram of FIG. 3, of at least two identical directional antennas 31 and 32. In order to obtain high selectivity, the device according to the invention associates antennas of large directivity in at least one plane, with a reception chain carrying out an autocorrelation of the signal received.

In a preferred embodiment, corresponding to the arrangement of FIG. 3, the two antennas 31 and 32 are plane antennas placed in a contiguous manner in one and the same plane, and arranged in such a way that their sighting axes are parallel and directed in the same sense. This configuration corresponds to that, well known, of a phase monopulse antenna.

However, according to the variant embodiment considered, these antennas can be arranged, in a known configuration of amplitude monopulse antenna, so as to exhibit phase centers situated at the same place, and to point in non-parallel directions, differing from one another by an angle α equal to a portion of their angular aperture. Such an arrangement is for example achievable with a multimode source placed at the focus of a parabolic reflector.

Alternatively again, the antennas can also be arranged so as to be separated from one another (non-adjacent antennas) and to sight in the same direction, thus corresponding to an ambiguous-interferometer configuration.

Alternatively again, the antennas can also be arranged so as to be separated from one another (non-adjacent antennas) and to sight in directions offset with respect to one another by an angle corresponding to a portion of the angular aperture.

Figure 5:
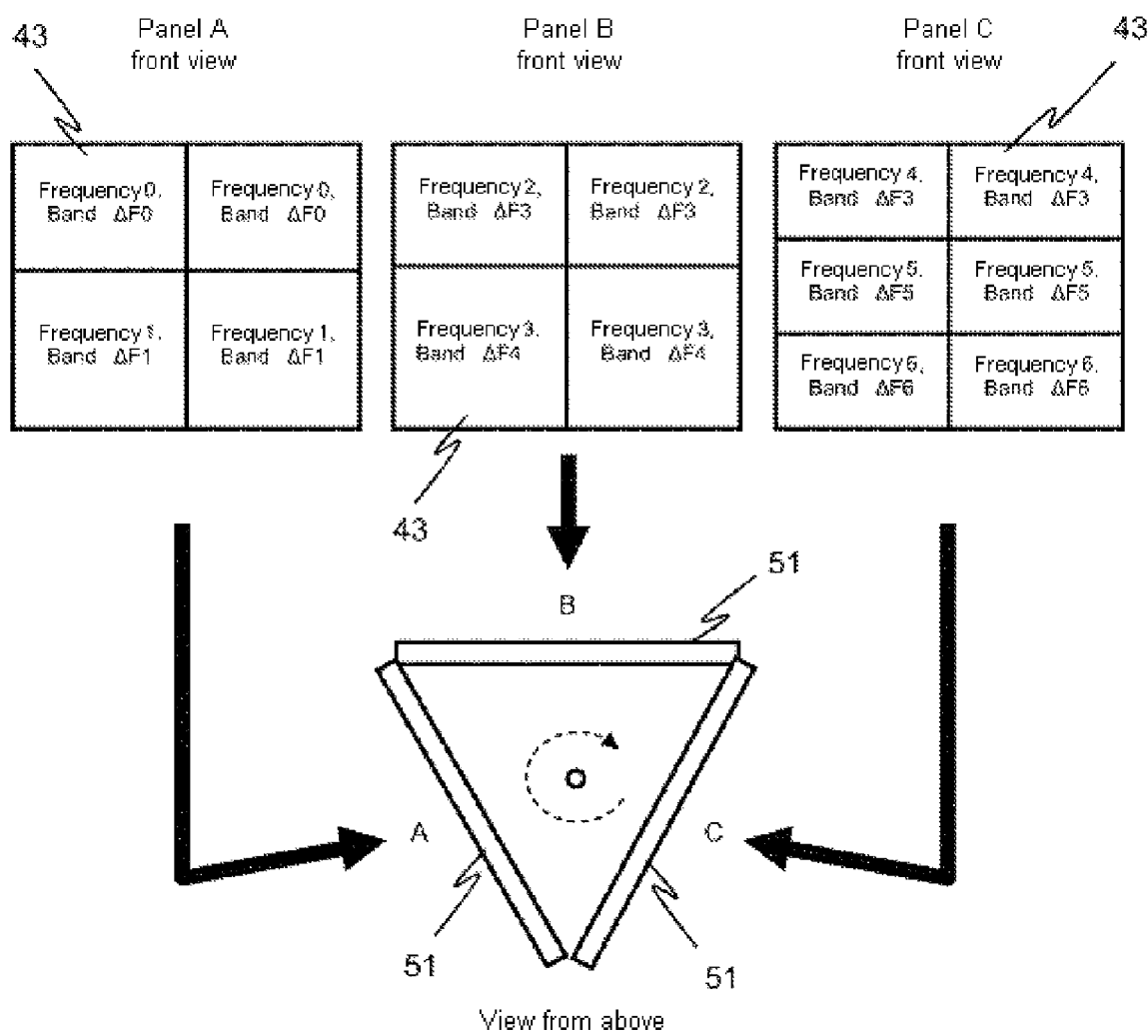
FIG. 5, a schematic representation of another particular embodiment of the antenna of the device according to the invention, the antenna exhibiting three radiating faces.

Alternatively finally, the angular coverage can also be obtained by associating a plurality of identical antennas 51, disposed on the faces of a prism with polygonal base, rotating about its vertical axis of symmetry, as illustrated schematically by FIG. 5.

Figure 4:
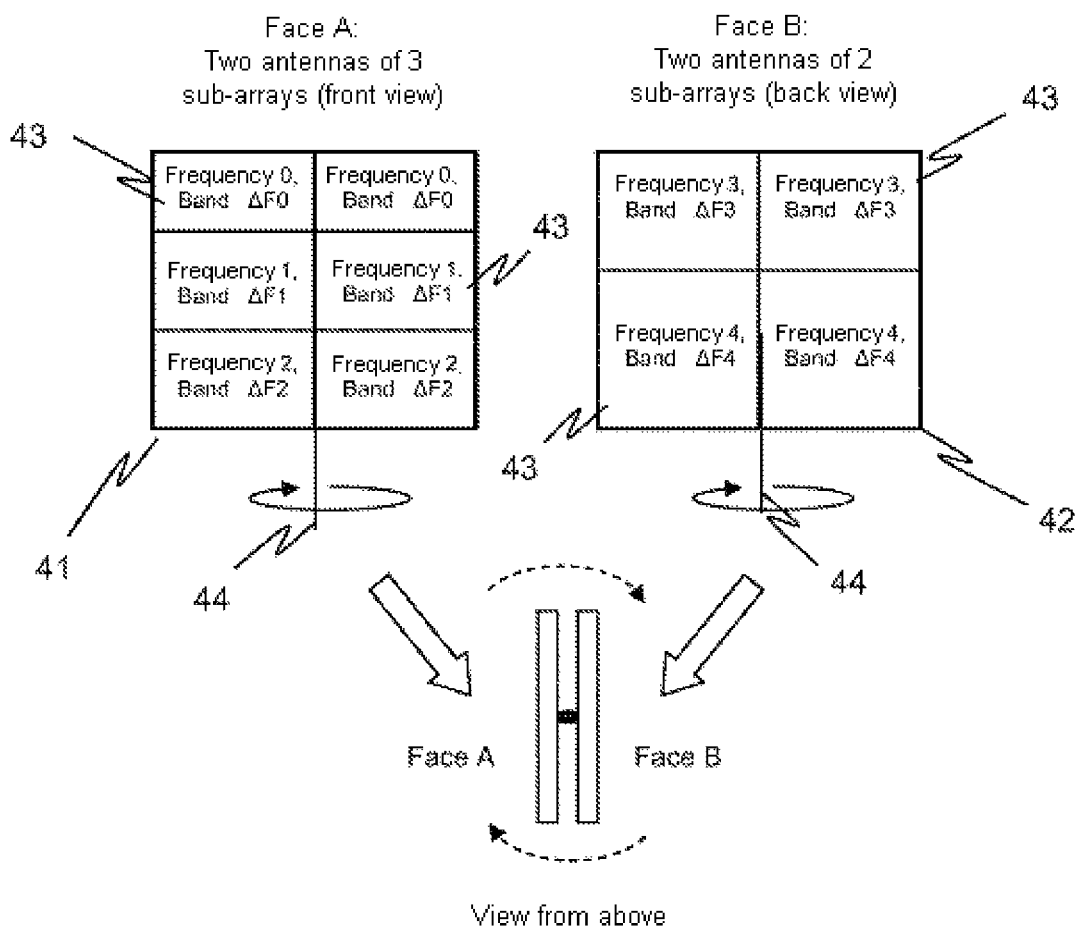
FIG. 4, a schematic representation of a first particular embodiment of the antenna of the device according to the invention, the antenna exhibiting two radiating faces.

According to a preferred embodiment, as illustrated notably by FIGS. 4 and 5, each of the two antennas 41, 42 consists of several sub-arrays 43 each assigned to a particular sub-band of the total band of frequencies BH of the emissions that one seeks to detect. Each sub-array is thus configured to receive the signals in a limited part of the band BH. Such a configuration advantageously makes it possible to deactivate, if necessary, some of the sub-arrays so as to avoid the disturbance caused by signals deemed undesirable.

According to the invention, the sub-arrays are distributed juxtaposed on either side of a vertical axis of symmetry, in a vertical plane, in such a way that their radiating patterns are directed to the same side of the plane. Each of the antennas thus exhibits, as illustrated by FIG. 3, a single radiating plane.

Alternatively, in a back-to-back configuration, the sub-arrays 43 can be placed in a vertical plane, with one half of the sub-arrays having a radiating pattern directed to one side of the plane and the other half having a pattern directed to the opposite side. In this case, each of the antennas exhibits, as illustrated by FIG. 4, two radiating faces back-to-back. Such a configuration makes it possible advantageously to decrease the height of the assembly.

Alternatively again, more complex geometric configurations, such as that illustrated by FIG. 5, for the arrangement of the sub-arrays 43 can be implemented for particular applications.

According to a preferred embodiment of the invention, which embodiment corresponds to the most general case, the antennas are mobile about a rotation axis so as to cover an angular domain of less than or equal to 360° in bearing, by mechanical scan. The antenna thus advantageously makes it possible to ensure surveillance over a wide angular sector in the horizontal plane (or bearing plane).

Moreover, as a function of the application envisaged, the antennas can be actuated so as to adopt a continuous rotation motion, according to a constant direction of rotation, or else in an alternating manner, in a given direction of rotation and then in the opposite direction.

Thus, for example, for an analysis band BH lying between 8 and 18 GHz, the device according to the invention can comprise two antennas each consisting of four sub-arrays according to the following frequency distribution:

sub-array 1: central frequency Fo=9 GHz, AF0=2 GHz;
sub-array 2: central frequency F1=11.125 GHz, AF1=2.25 GHz;
sub-array 3: central frequency F2=13.625 GHz, AF2=2.75 GHz;
sub-array 4: central frequency F3=16.5 GHz, AF3=3 GHz.

From a production point of view, the various sub-arrays constituting the antenna can be produced in various known ways. In order to limit the costs of production, these sub-arrays can advantageously be produced by printed circuit technology.

Figure 6:
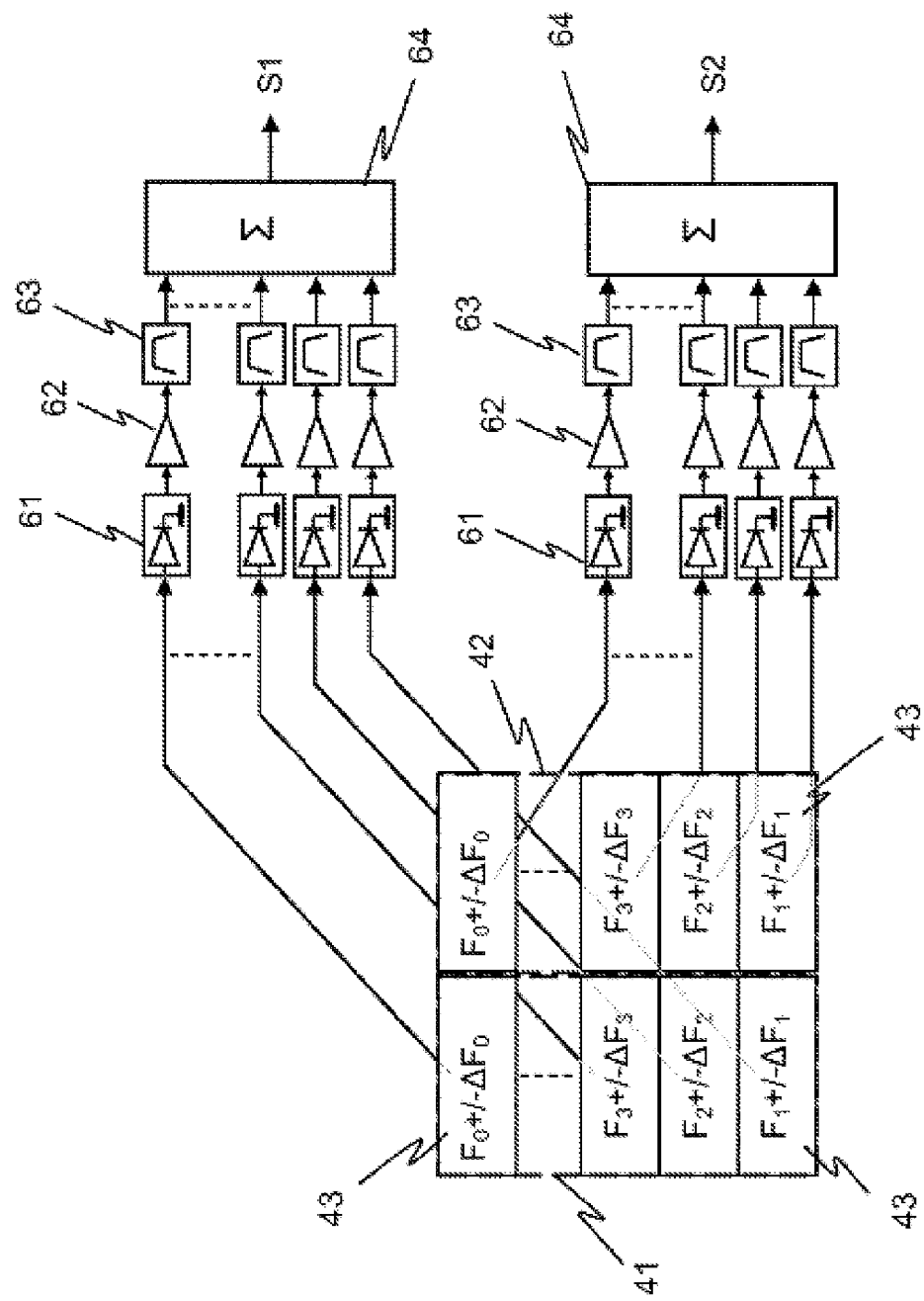
FIG. 6, a schematic illustration of the principle of formation of the reception pathways in a preferred embodiment of the device according to the invention.

From a functional point of view, according to a preferred embodiment of the device according to the invention, each sub-array 43 has, as illustrated by FIG. 6, its own inherent output, which is connected to an output device comprising specific circuits for limitation 61, low-noise amplification 62, and filtering 63.

Therefore, after radiofrequency amplification and filtering, the outputs of the various sub-arrays of each antenna are summed 64, so that after grouping of the pathways, each of the antennas now comprises just a single reception pathway providing a signal S1 or S2.

Alternatively, in a more restricted variant embodiment, the summation of the pathways corresponding to the various sub-arrays can be carried out before amplification.

In a preferred embodiment the output device of each of the sub-arrays is configured so as to enable the activation of some part of the sub-arrays, or indeed of a single sub-array. It is thus possible advantageously to increase the discriminating capacity and the sensitivity of the device in a given sub-band by limiting the noise in the noise power received by the receiver and optionally by eliminating undesired signals. This can be done simply by envisaging means for cutting off the power feed to the low-noise amplification circuits (LNA) 62, with the aid of a diode-type switch for example.

The reception device according to the invention secondly comprises means forming a broadband reception chain for the signals picked up by the antennas. As stated above, these signals have a spectrum centered on an a priori unknown central frequency $F_0$, included in the band BH considered. The function of these means is to demodulate one by the other the signal S1 received by one of the antennas constituting the interferometry base and the signal S2 received by the other antenna, thus amounting to carrying out an autotransposition of the signal received.

According to the invention, the demodulation is preferably carried out by formation of frequency-transposed signals on the basis of the signals picked up S1 and S2, and mixing of the frequency-transposed signals, the signals received S1 and S2 being transposed around different frequencies, in such a way that the beating between the two transposed signals generates a signal centered on a predefined intermediate frequency Fl. This dual frequency transposition advantageously makes it possible to guarantee optimal sensitivity of the receiver of the device according to the invention in relation to noise, and to circumvent the offset (shifted) DC voltages which could limit the reception dynamics.

Figure 7:
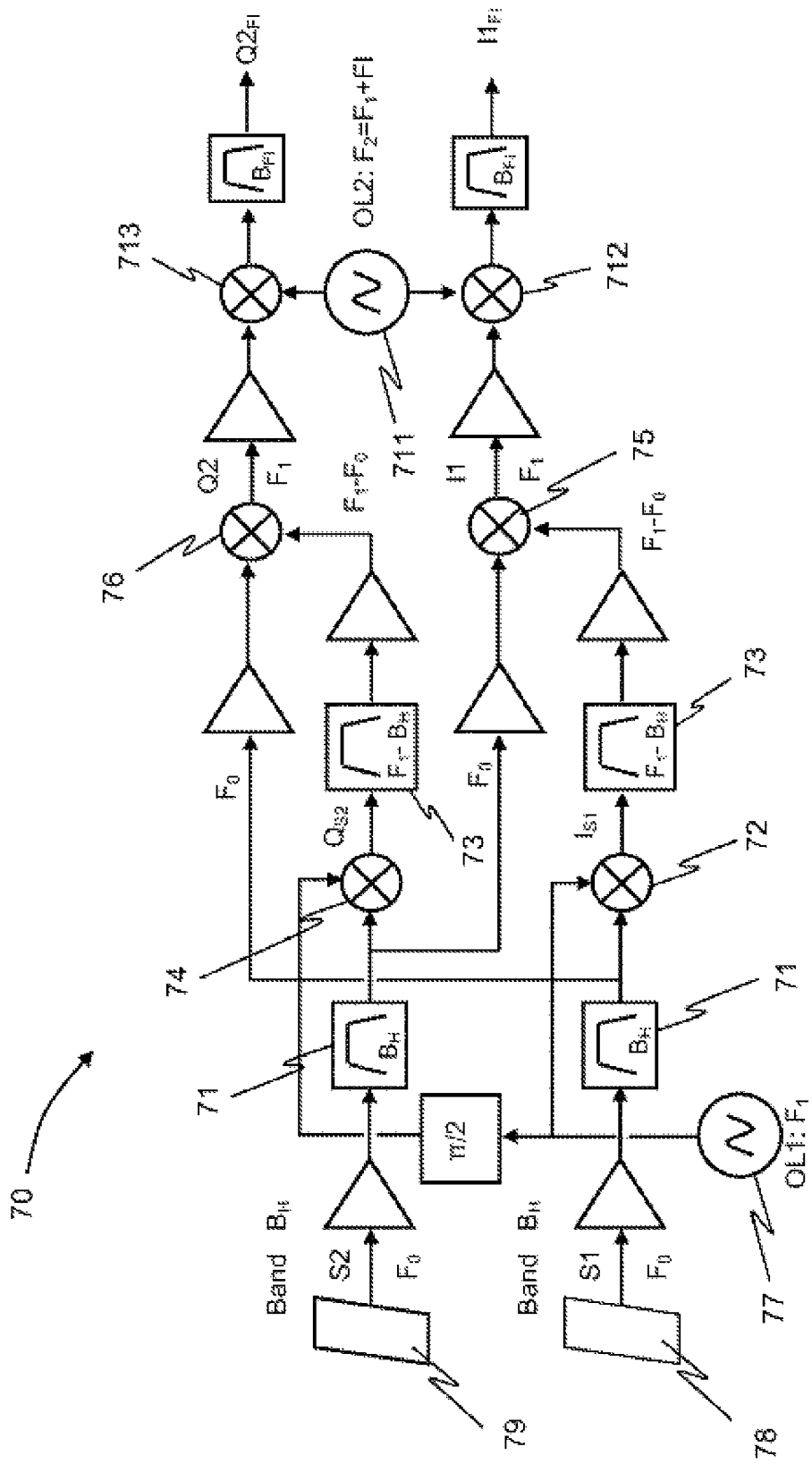
FIG. 7, a schematic illustration of the reception device according to the invention.

FIG. 7 presents in a schematic manner, by way of example, a preferred embodiment of the device according to the invention. The diagram of FIG. 7 chiefly details the various elements chiefly forming the reception chain making it possible to carry out the autotransposition of the signal received.

According to this embodiment, the autotransposition consists of an amplitude-phase demodulation. The intermediate-frequency signal produced is a complex signal comprising two components in phase quadrature a real signal $I1_{F1}$ (real component) and a signal $Q2_{F1}$ (imaginary component). The two signals $I1_{F1}$ and $Q2_{F1}$ are produced by two separate analogous chains.

For this purpose, the autotransposition function is for example formed of two identical pathways phase-shifted by $\pi/2$ with respect to one another, the radioelectric signals S1 and S2 being mixed, at the output of the microwave-frequency receiver, with two phase quadrature reference signals produced by a first local oscillator 77 of frequency F1.

Thus, after amplification and bandpass filtering 71, the radioelectric signal S1 received by the first antenna, of unknown frequency $F_0$, is demodulated in first mixer stage 72 by a first local oscillator 77 of frequency F1 to give rise, after bandpass filtering 73 and optionally amplification, to a signal $I_{S1}$ of frequency $F_1$-$F_0$.

In an analogous manner, the second antenna receives a radio signal S2 of frequency $F_0$ identical to the frequency of the signal S1, but phase-shifted with respect to the latter by a phase shift $\Delta\phi$ which is dependent on the angular direction $\theta$ of arrival of the signal. This phase shift is given by the following relation:

$$\Delta\phi = 2\pi \cdot d \cdot F_0 \cdot \sin(\theta)/c,$$

where c represents the speed of light and d the distance between the phase centers of the two antennas.

After amplification and bandpass filtering 71, the signal S2 is, in a manner analogous to the signal S1, demodulated in a first mixer stage 74 by the local oscillator 77 at the frequency $F_1$, phase-shifted by $\pi/2$, to give rise after bandpass filtering 73 and optionally amplification, to a signal $Q_{S2}$ of frequency $F_1$-$F_0$.

After a first transposition 72, the signal $I_{S1}$, of frequency $F_1$-$F_0$, is demodulated by the signal S2 of frequency $F_0$ in a second mixer stage 75 to give rise, optionally after filtering, to the signal I1 of frequency $F_1$.

In an analogous manner, after a first transposition 74, the signal $Q_{S2}$, of frequency $F_1$-$F_0$, is demodulated by the signal S1 of frequency $F_0$ in a second mixer stage 76 to give rise, optionally after filtering, to the signal Q2 of frequency $F_1$.

It should be noted that this second mixer stage 75 or 76 performs a frequency transposition to the higher frequencies, in such a way that the phase difference $\Delta\phi$ between the signals S1 and S2 generates a phase difference $2\Delta\phi-\pi/2$ between the signals I1 and Q2 at the output of the mixers 75 and 76. This upward frequency transposition is an indispensable condition so as not to eliminate the phase difference $\Delta\phi$ in the device.

The signals I1 and Q2 are thereafter themselves demodulated in a third mixer stage 712, 713 by a second local oscillator 711, of frequency $F=F_2+F1$, to produce two signals $I1_{F1}$ and $Q2_{F1}$, centered on the frequency F1.

The two signals $I1_{F1}$ and $Q2_{F1}$ thus produced are mutually phase-shifted by $4\cdot\pi\cdot d\cdot F_0\cdot\sin(\theta)/c-\pi/2$, $\theta$ being an angle dependent on the direction of arrival of the signal and the directions $\theta_1$ and $\theta_2$ of pointing of the antennas.

It should be noted that to obtain satisfactory operation of the reception device according to the invention, the microwave-frequency part of the device according to the invention, notably consisting of the elements upstream of the first mixer stage, exhibits the following technical characteristics

- the antennas 78 and 79 used have significant gain, typically from 20 to 30 dB, so that that the signal-to-noise ratio is sufficient at the autotransposition input. Such a gain is for example possible with antennas consisting of juxtaposed sub-arrays with limited bands;
- the reception band of each of the antennal sub-arrays is limited by filtering, so as to avoid receiving signals outside of the useful band for which it is not adapted;
- the signals S1 and S2 produced by the two antennas are amplified with a sufficient gain so that the level of injection of the microwave-frequency signal considered, S1 or S2, on the "local oscillator" inputs of the mixer stages 75 and 76 allows saturation of the mixing diodes constituting the mixers, doing so whatever the level of the useful signal S1, or S2 at the input of the receiver. Typically, this level is of the order of 10 dBm. In practice, the microwave-frequency amplification gain is defined so that in the presence of noise alone, the saturation level of the mixer stages is attained. To do this, use will be made, for example, of a limited amplifier to feed the OL (i.e. Local Oscillator) input of the mixers;
- the frequency of the local oscillator of the stage for transposition to intermediate frequency F1 is chosen so as to be greater than the value of the microwave-frequency reception band BH, so as to avoid the aliasing of the noise in this band. Thus, by way of example, for a reception band BH lying between 8 and 18 GHz, it will be possible to choose $F_1=22$ GHz and F2=24 GHz;
- the autotransposition performed, at the level of the mixer stages 75 and 76, to ensure the complex autodemodulation of the signal received is carried out by selecting by filtering, at the output of these mixers, the signal corresponding to the upward frequency conversion (F1).

The operation of the reception device according to the invention is thus based on the autotransposition and the autocorrelation of the signals picked up in a synchronous manner by at least two directional antennas, signals arising from one and the same emission source which simultaneously illuminates the two antennas. Therefore all the signals received are advantageously transposed around one and the same frequency in one and the same narrowband receiver, whatever their original frequency.

Advantageously, this receiver is thus, in principle, auto-adapted to the detection of the signals received, whatever their waveform characteristics and frequency characteristics, and the performance obtained approaches that obtained in an ideal radar receiver.

As regards the antenna used by the device according to the invention, it should be noted that the antennal device as a whole can also, when circumstances so allow, be placed at the rear of an existing radar antenna, taking advantage of the latter's rotation mechanism.

In an analogous manner, the whole assembly of electronic circuits constituting the device according to the invention can be placed in a revolving position, integral with the radiating panel.

It should moreover be noted that, in the case where the device according to the invention is associated with a long-range radar comprising an antenna of "slab" type, the device according to the invention can be installed at the rear of the radar slab. In this manner, it is possible to have revolving antenna surfaces of large dimensions allowing significant antenna gains and therefore great sensitivity. Thus, detection of signals of very low power is therefore possible, and this may make it possible to improve the range.

Solutions with conformal antennas are also possible.

It should be noted finally that, although the whole of the device according to the invention has been described in the foregoing text as being intended to process the emissions received by forming two intermediate-frequency signals $I1_{F1}$ and $Q2_{F1}$, in phase quadrature with respect to one another, it is of course possible to design a simplified device configured so as to form and process just a single pathway, the pathway $I1_{F1}$ for example. However, in the particular case where a single pathway is used to produce just a single intermediate-frequency signal $I1_{F1}$ (or $Q2_{F1}$), the proper operation of the device implies that the two local oscillators, at $F_1$ and $F2=F_1+F1$, must be phase coherent.

Such a simplification is advantageously manifested by a division by 2 of the number of electronic circuits required. On the other hand it is also manifested by a loss of sensitivity of 3 dB.

The reception device according to the invention, such as it is described in the foregoing text, can obviously be implemented in various types of applications. In the subsequent description, an application is presented, by way of nonlimiting example, in which the device according to the invention is associated with processing means so as to form a vaster device making it possible to detect emissions performed by an unknown source as well as to characterize these emissions and to locate the source thereof. The functional diagram of the device is represented by the juxtaposition of the diagrams of FIGS. 6 and 7, the outputs $I1_{F1}$ and $Q2_{F1}$ of the detection device according to the invention which is represented in FIG. 7 being linked to the inputs $I1_{F1}$ and $Q2_{F1}$ of the means represented in FIG. 8.

Figure 8:
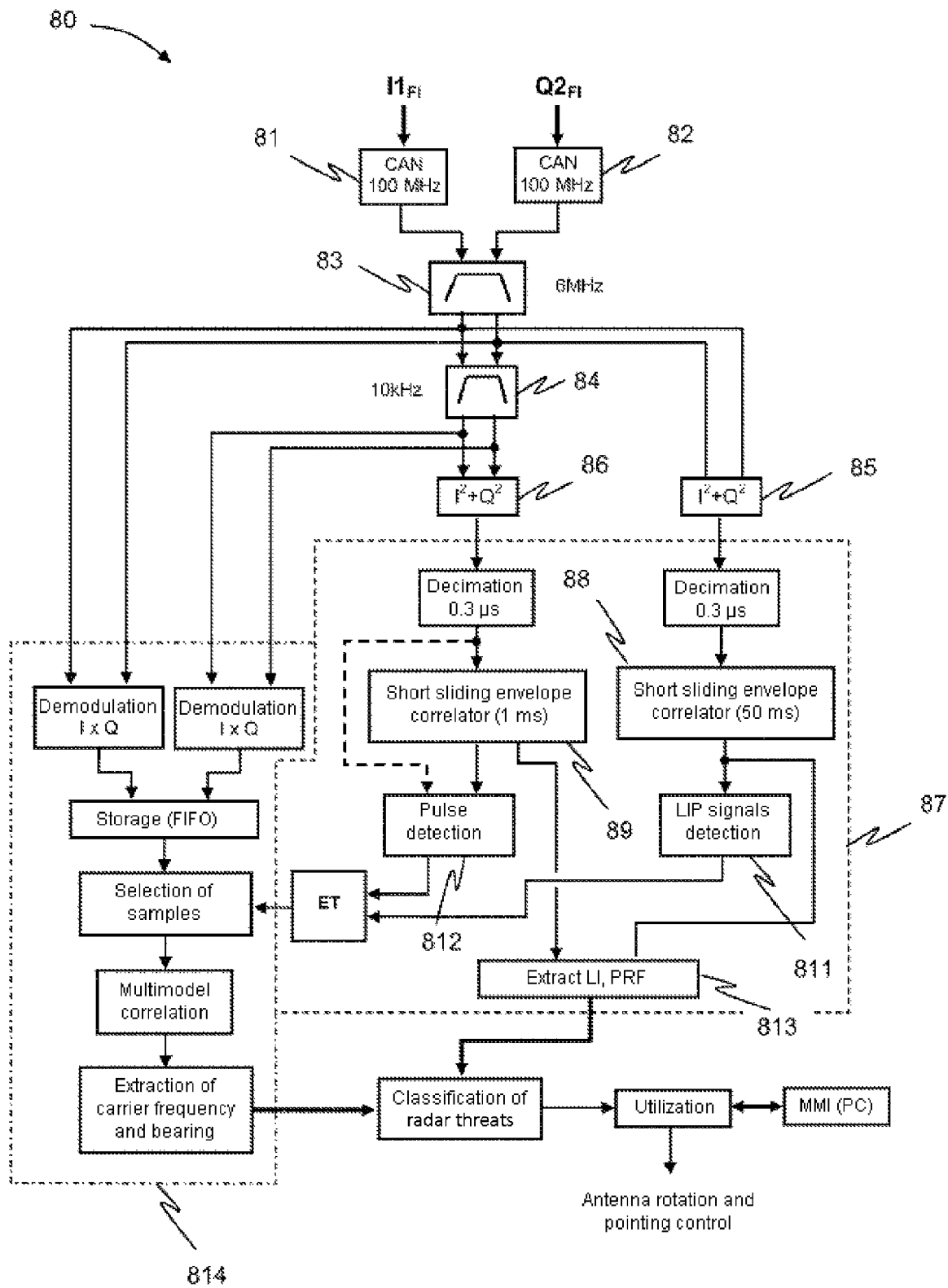
FIG. 8, a schematic illustration of the principle of a digital processing chain associated with the device according to the invention.

For this purpose, the device considered for detecting and characterizing radioelectric emissions associates the broadband reception device 70 according to the invention with a processing chain 80, illustrated by FIG. 8, comprising the following means:

- digitization means 81, 82 for digitizing the signals $I1_{F1}$ and $Q2_{F1}$ produced by the reception device according to the invention;
- first means of digital processing carrying out a filtering of the signals digitized by a filter matched to the shape of the expected signal. This filter can, according to the type of modulation of the emitted wave, be matched to the duration of the shortest expected pulse or else to the duration of the shortest modulation.

It should be noted that, in the case where we are concerned with signals of diverse natures, it is possible to implement in parallel, as illustrated by FIG. 8, several filters 83, 84 having different passbands:

second processing means 87 whose function is to carry out on the one hand the detection of an emission and on the other hand the measurement of the duration and of the period of repetition of the corresponding signal;

third processing means 811 whose function is to carry out in parallel with the detection processingb 87, the measurement of the frequency of the radioelectric emission picked up and the determination of the bearing of the source from which the detected emission originates.

The function of the first processing means is to carry out, at the output of the reception device, a filtering stage 83 matched to the shortest pulse expected in the case of a pulsed emission, or a stage of matched 84 to the duration of the shortest modulation code expected in the case of an LPI emission. The filtering stage thus implemented advantageously makes it possible to optimize the sensitivity of the device.

In a particular embodiment the device considered for detecting emissions cascades two filtering stages, for example, a first stage 83 of bandwidth Bv=6 MHz adapted to pulses of minimum widths of the order of 0.3 μs, and a second stage 84 of bandwidth Bv=10 kHz, adapted to coded signals, the shortest expected code having a duration of 100 μs.

In a preferential manner, as illustrated by FIG. 8, the filtering applied is carried out in digital form, after sampling and coding 81, 82 of the signals $I1_{Fl}$ and $Q2_{Fl}$ delivered by the reception device according to the invention illustrated by FIG. 7. The filtering of the signals in digital form advantageously makes it possible to easily match the passband of the filter (or of the filters) to the signals considered, as a function of the context, or to generate several filters of different characteristics in parallel, the signals obtained corresponding to as many different waveforms, processed separately.

The function of the second processing means 87 is to carry out on the one hand the detection of an emission and on the other hand the measurement of the duration and of the period of repetition of this modulated emission per pulse, these measurements being carried out on the envelope of the signal. Here the signal received is represented by the square of its modulus after quadratic detection 85 or 86.

The envelope of the signal is itself obtained by application of a quadratic detection 85, 86, to the outputs of the matched filter 83, 84 (or of the matched filters) and determination, by sliding correlation.

According to the type of the emission considered, the detection of the emission is carried out, as illustrated by FIG. 8, either on the modulus of the signal obtained after quadratic detection 85, 86, or on the envelope of this signal obtained after application of a prior autocorrelation processing 88, 89 to this signal. Carrying out the detection of an emission on the envelope of the signal advantageously makes it possible to boost the detection sensitivity, chiefly in respect of signals originating from LPI emissions, and, in all cases, to increase the temporal selectivity of the processing and to estimate the duration and the period of recurrence of the pulses. The expression for the correlation function applied to the signal is, in a conventional manner:

$$C(k) = \sum_{i=1}^{N} x(i)x(i+k)$$

Where here, in a known manner, x represents the signal, i its temporal index and k the index of the delay considered.

The function of the third processing means 814 is to carry out in parallel with the detection processing, on the basis of the Fl signals, $I1_{Fl}$ and $Q2_{Fl}$, and after sampling and digitization, a measurement of the bearing and of the central frequency $F_0$ of the radioelectric signal picked up. These measurements are carried out by interferometry between the two reception pathways $I1_{Fl}$ and $Q2_{Fl}$ after matched filtering, in accordance, for example, with the method described in French patent application No 1100337 filed by the applicant on Mar. 2, 2011, as illustrated in FIG. 8. According to the invention, this measurement is performed at each pulse detection and is triggered by the detection processing 87.

The various items of information produced by the device for detecting and characterizing emissions, equally well by the second processing means (detections) as by the third processing means (frequency measurement and location in bearing), are intended to be transmitted to utilization means, for classifying the detected emissions, which can themselves transmit them after conditioning to a man-machine interface whose role is to present to an operator the global characteristics of the detected emissions, for example: the pulse duration, the repetition period, the frequency $F_0$ of the emission, and the angular position of the source (non-limiting list).

Figure 9:
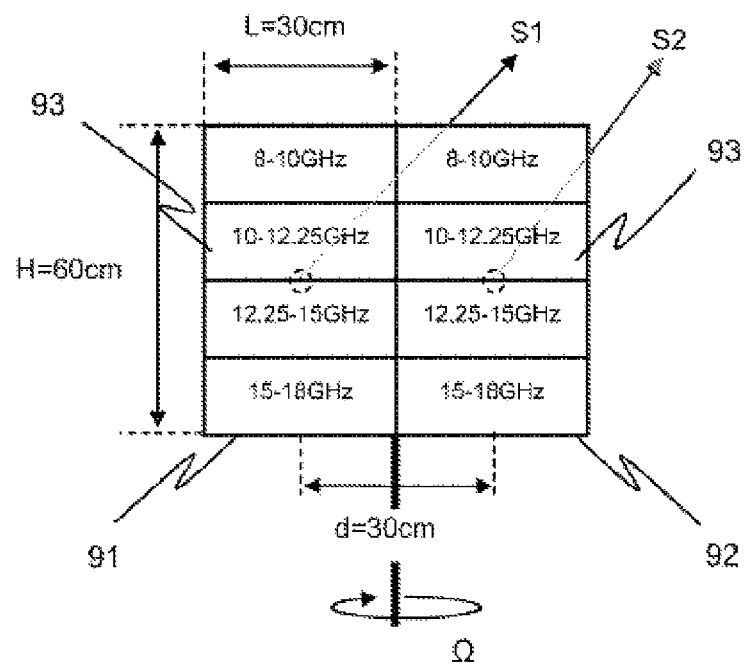
FIGS. 9 and 10, illustrations relating to two particular embodiments of the antenna of the device according to the invention, taken as examples.
Figure 10:
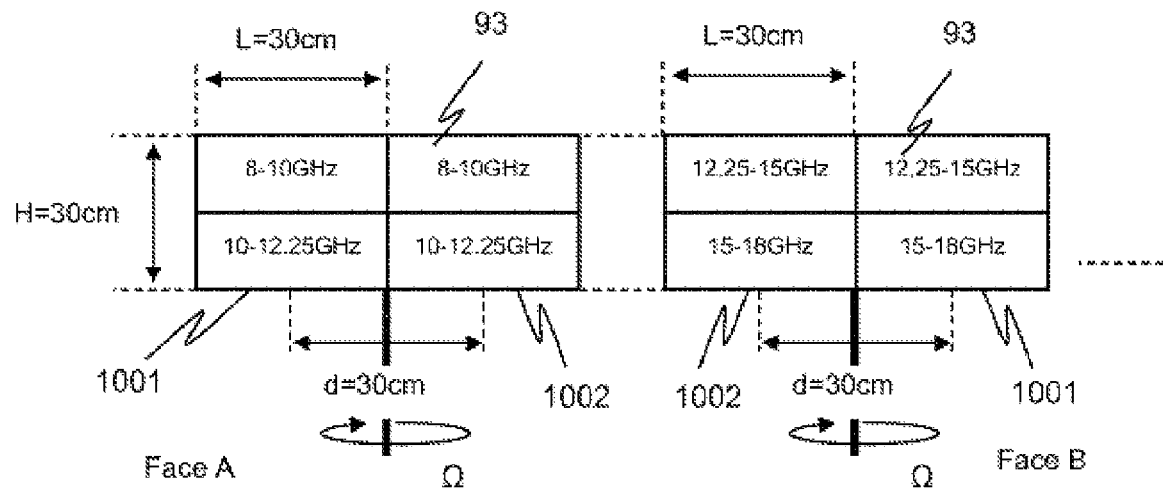

It should be noted that the chief characteristics of the various elements making up the reception device according to the invention (cf. FIG. 7) and of those making up the associated processing means (cf. FIG. 8) are determined by the emissions that one seeks to detect. Thus, for example, if it is sought to produce a device making it possible to detect emissions in an expanse of frequencies lying between 2 and 18 GHz, it is possible, for example, to implement a detection device, in accordance with FIG. 7, exhibiting in particular the following technical characteristics:

Use of an antenna of phase monopulse type with large gain, typically 20 dB, placed on a rotation axis. Such an antenna can for example, as illustrated by FIG. 9, comprise two panels 91 and 92, juxtaposed in one and the same plane, defining two reception pathways S1 and S2. Each panel consists of four sub-arrays 93, each of the sub-arrays covering a part of the total reception band (2-18 GHz) according to the frequency distribution and the typical dimensions presented in FIG. 9 for example. After filtering, limitation and amplification, the outputs of the various sub-arrays 93 of each of the antennas 91 or 92 are summed, giving a single microwave-frequency pathway per antenna. Alternatively, the two antennas 1001 and 1002 can consist of sub-arrays 93 grouped together in 2s and placed on two panels placed back-to-back in order to reduce the height of the assembly, as represented in FIG. 10;

Use for the reception of two reference oscillators whose frequencies are respectively equal to F1=24 GHz and F2=22 GHz. At the output of the receiver two demodulated pathways $I1_{Fl}$ and $Q2_{Fl}$, phase-shifted with respect to one another, are available whose central frequency is equal to 2 GHz (difference in frequency between the two local reference oscillators used) and whose passband is moreover limited by filtering, to 50 MHz for example.

This detection device can furthermore be associated with means for digitization, matched filtering and digital processing, in accordance with FIG. 8, exhibiting in particular the following technical characteristics:

the Fl signals obtained, $I1_{Fl}$ and $Q2_{Fl}$, are digitized, by analog-digital converters 81 and 82, with a sampling frequency of 100 MHz for example;

the digitized signals are filtered by two filters 83 and 84 of passband corresponding respectively to the bandwidth of the shortest expected pulse, and to the shortest phase code or frequency code expected for the LPI emissions, bands respectively equal to 6 MHz and 10 kHz for example;

At the output of these filters, the processing operations for detecting pulsed emissions and those for continuous emissions, of LPI type for example, are performed according to similar principles, with different settings, adapted to each of the configurations:

Quadratic detection $I^2+Q^2$: 85, 86;

Decimation, typically over 0.3 µs;

Envelope correlation, typically over a time of 1 ms on the pulse pathway, and over 50 ms on the LPI pathway: 88 and 89;

Detection by comparison with an adapted threshold: 811 and 812;

Estimation 813 of the pulse durations and repetition periods.

It should be noted that in a manner analogous to what happens for the reception device according to the invention, the whole assembly of electronic circuits constituting the processing means can be placed, when possible, in a revolving position, integral with the radiating panel. Alternatively, it is also possible to separate the device for detecting emissions into two elements, a sub-assembly consisting of the reception device according to the invention (cf. FIG. 7) integral with the antenna in rotation, and a sub-assembly consisting of the digitization and digital processing means (cf. FIG. 8) sited remotely in a fixed part. In the latter case, the transfer of the signals between the two sub-assemblies can be carried out with the aid of a revolving joint, optionally using optical technology.

The invention claimed is:

1. A broadband reception device, adapted to a reception of radioelectric emissions of a central frequency $F_0$ included in a band of frequencies BH, said broadband reception device comprising:

two broadband identical antennas with a large gain, said broadband identical antennas are directional in at least one plane, the two broadband identical antennas being pointed substantially in a same direction, each of the two broadband identical antennas producing a radioelectric signal S1 or S2 on the basis of emissions picked up;

a reception chain comprising two phase-coherent local oscillators, of respective frequencies F1 and F2=F1+Fl, Fl being an intermediate frequency signal, said respective frequencies are greater than a maximum frequency of the band BH, said reception chain carrying out a demodulation of the radioelectric signals S1 and S2 into the intermediate-frequency signal Fl;

the intermediate-frequency signal Fl being obtained in two steps:

first, demodulating the signal S1 or the signal S2 by a signal respectively obtained by frequency transposition of the other signal, the signal S2 or S1 respectively, by the local oscillator of frequency F1 and by selecting a lower sideband of a spectrum obtained; filtering the demodulated signal to preserve only an upper sideband of the spectrum obtained after the demodulation;

second, transposing into intermediate frequency, Fl, the signal obtained by demodulation of the signal S1 or S2 by the local oscillator of frequency F2=F1+Fl;

the intermediate-frequency signal Fl produced being centered on a constant intermediate frequency independent of the central frequency $F_0$ of the signals received.

2. The broadband reception device as claimed in claim 1, wherein the broadband identical antennas are contiguous antennas arranged according to a phase monopulse configuration, in such a way that sighting axes of the broadband identical antennas are directed in the same direction.

3. The broadband reception device as claimed in claim 1, wherein the broadband identical antennas are arranged, according to an amplitude monopulse antenna configuration, in such a way that phase centers of the broadband antennas are situated at a same place, and that they point in non-parallel directions, differing from one another by an angle α equal to a portion of their angular aperture.

4. The broadband reception device as claimed in claim 1, wherein the broadband identical antennas are arranged, according to a configuration forming an ambiguous interferometry base, to be separated from one another by a space and to sight in the same direction.

5. The broadband reception device as claimed in claim 1, wherein the broadband identical antennas are arranged to be mutually spaced apart and sight in directions offset with respect to one another by an angle corresponding to a portion of an angular aperture.

6. The broadband reception device as claimed in claim 1, wherein broadband identical antennas form an antennal assembly, wherein the antenna assembly is directional in bearing.

7. The device as claimed in claim 1, wherein broadband identical antennas form an antennal assembly, wherein the antennal assembly is mobile in rotation according to a mechanical scan about a vertical axis, to cover an angular sector of less than or equal to 360° in bearing.

8. The broadband reception device as claimed in claim 1, wherein each antenna includes independent sub-arrays, covering adjacent bands of frequencies, an assembly of sub-arrays covering a totality of the band of frequencies BH to be explored.

9. The broadband reception device as claimed in claim 8, wherein the antennas include sub-arrays arranged in a same vertical plane according to adjacent columns formed of superposed sub-arrays.

10. The broadband reception device as claimed in claim 8, wherein the antennas include sub-arrays arranged in vertical planes placed back-to-back.

11. The broadband reception device as claimed in claim 8, wherein the antennas include sub-arrays arranged on faces of a prism with a polygonal base mobile in rotation about an axis.

12. The broadband reception device as claimed in claim 8, wherein each sub-array comprises a specific output with which are associated limitation, amplification and filtering means for limiting, amplifying, and filtering the received radioelectric signals, respectively.

13. The broadband reception device as claimed in claim 12, wherein the outputs of the sub-arrays forming a same antenna are summed after amplification and filtering, to form a single output per antenna.

14. The broadband reception device as claimed in claim 8, wherein each sub-array is configured so as to be activated or deactivated independently of the other sub-arrays.

15. A broadband reception device adapted to a reception of radioelectric emissions of a central frequency $F_0$ included in a band of frequencies BH, said broadband reception device comprising:

two broadband identical antennas with a large gain, said broadband identical antennas are directional in at least one plane, the two broadband identical antennas being pointed substantially in a same direction, each of the two broadband identical antennas producing a radioelectric signal S1 or S2 on the basis of emissions picked up;

a reception chain comprising two local oscillators, of respective frequencies F1 and F2=F1+Fl, Fl being an intermediate frequency signal, said respective frequencies are greater than a maximum frequency of the band BH, said reception chain carrying out a demodulation of the radioelectric signals S1 and S2 into two intermediate-frequency signals $I1_{Fl}$ and $Q2_{Fl}$;

the two intermediate-frequency signals $I1_{Fl}$ and $Q2_{Fl}$ being obtained in two steps:
- first, demodulating each of the two radioelectric signals S1 or S2 by a signal, $Q_S2$ or $I_S1$ respectively, obtained by a frequency transposition of the other radioelectric signal, the signal S2 or S1 respectively, by a signal of frequency F1 respectively in phase quadrature or in phase with the local oscillator of frequency F1 and by selecting a lower sideband of a spectrum obtained; filtering the demodulated signals I1 and Q2 to preserve only an upper sideband of the spectrum obtained after the demodulation;
- second, transposing into intermediate frequency, Fl, the signals I1 and Q2 obtained by demodulation of the signals S1 and S2 by the local oscillator of frequency F2=F1+Fl;

the intermediate-frequency signals $I1_{Fl}$ and $Q2_{Fl}$ produced being centered on a constant intermediate frequency independent of the central frequency $F_0$ of the signals received.

16. The device as claimed in claim 15, wherein the broadband identical antennas are contiguous antennas arranged according to a phase monopulse configuration, in such a way that sighting axes of the broadband identical antennas are directed in a same direction.

17. The device as claimed in claim 15, wherein the broadband identical antennas are arranged, according to an amplitude monopulse antenna configuration, in such a way that phase centers of the broadband identical antennas are situated at a same place, and that the broadband identical antennas point in non-parallel directions, differing from one another by an angle α equal to a portion of angular apertures of the broadband identical antennas.

18. The device as claimed in claim 15, wherein the broadband identical antennas are arranged to be mutually spaced apart and sight in directions offset with respect to one another by an angle corresponding to a portion of angular apertures of the broadband identical antennas.

19. The device as claimed in claim 15, wherein the broadband identical antennas are arranged, according to a configuration forming an ambiguous interferometry base, to be separated from one another by a space and to sight in a same direction.

20. A device for detecting and characterizing radioelectric emissions adapted to a reception and to a characterization of radioelectric emissions of a central frequency $F_0$ included in a band of frequencies BH, said device comprising:
- a broadband reception device producing two intermediate-frequency signals $I1_{Fl}$ and $Q2_{Fl}$;
- a processing chain comprising:
- digitization means for carrying out an analog-digital conversion of the two intermediate-frequency signals $I1_{Fl}$ and $Q2_{Fl}$;
- first processing means for performing, at an output of the broadband reception device, after the analog-digital conversion, a matched filtering of the digitized signals $I1_{Fl}$ and $Q2_{Fl}$;
- second processing means for carrying out a detection of an emission by comparing a signal level received with a given detection threshold and a measurement of a duration and of a period of repetition of an emitted signal received on a basis of an envelope of the received signal;
- third processing means for carrying out out, in parallel with the processing carried out by the second means, on a basis of the intermediate-frequency signals $I1_{Fl}$ and $Q2_{Fl}$ and after sampling and digitization, a measurement of the frequency of the radioelectric emission detected as well as a measurement of a bearing locating a source of the radioelectric emission, carried out by an interferometric measurement between two reception pathways of the intermediate-frequency signals after said matched filtering.

21. The device as claimed in claim 20, wherein outputs of the reception device are connected after said analog-digital conversion to an input of the filter matched to a duration of a shortest expected pulse.

22. The device as claimed in claim 20, wherein outputs of the reception device are connected after said analog-digital conversion to an input of the filter matched to a shortest expected modulation code.

23. The device as claimed in claim 20, wherein the second processing means carry out a quadratic detection of the signals delivered by the matched filters.

24. The device as claimed in claim 23, wherein the second processing means carry out an envelope autocorrelation performed on the signals obtained by the quadratic detection.

25. The device as claimed in claim 23, wherein the detection of an emission is performed by comparison with a threshold of the signals received, after the quadratic detection.

26. The device as claimed in claim 23, wherein the detection of an emission is performed by comparison with a threshold of the signals received after the quadratic detection and an envelope autocorrelation.

* * * * *